(12) United States Patent
Olszewski et al.

(10) Patent No.: US 12,353,021 B2
(45) Date of Patent: Jul. 8, 2025

(54) RETROFIT COVER FOR FIBER OPTIC CABLE CONNECTION

(71) Applicant: PREFORMED LINE PRODUCTS CO., Mayfield Village, OH (US)

(72) Inventors: Jonathon Randall Olszewski, Elyria, OH (US); John Lewis Hornsby, Ravenna, OH (US); Benjamin Franklin Ciesielczyk, Madison, OH (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 426 days.

(21) Appl. No.: 17/797,870

(22) PCT Filed: Mar. 17, 2020

(86) PCT No.: PCT/US2020/023228
§ 371 (c)(1),
(2) Date: Aug. 5, 2022

(87) PCT Pub. No.: WO2021/188099
PCT Pub. Date: Sep. 23, 2021

(65) Prior Publication Data
US 2023/0066571 A1    Mar. 2, 2023

(51) Int. Cl.
*G02B 6/36* (2006.01)
*G02B 6/35* (2006.01)
*G02B 6/38* (2006.01)

(52) U.S. Cl.
CPC ........... *G02B 6/3849* (2013.01); *G02B 6/358* (2013.01); *G02B 6/3879* (2013.01); *G02B 6/3897* (2013.01)

(58) Field of Classification Search
CPC .... G02B 6/3849; G02B 6/358; G02B 6/3879; G02B 6/3897; G02B 6/387; G02B 6/3825; G02B 6/36
See application file for complete search history.

(56) References Cited

U.S. PATENT DOCUMENTS

| | | | |
|---|---|---|---|
| 6,739,759 B1 | 5/2004 | Seeley | |
| 10,591,677 B2 * | 3/2020 | Olszewski | ........... G02B 6/3849 |
| 2014/0154914 A1 | 6/2014 | Schneider | |
| 2017/0261695 A1 | 9/2017 | Olszewski et al. | |
| 2019/0157800 A1 * | 5/2019 | Völker | ................. G02B 6/3849 |
| 2020/0064561 A1 | 2/2020 | Alrutz | |

* cited by examiner

*Primary Examiner* — Jennifer Doan
(74) *Attorney, Agent, or Firm* — Cooper Legal Group, LLC

(57) ABSTRACT

A cover for a fiber optic cable connection includes a cap portion having a first housing portion having a first housing wall and a second housing portion having a second housing wall. A union portion has a union wall defining a union opening and is configured to receive the first housing portion and the second housing portion to couple the first housing portion and the second housing portion in a closed position. The first housing wall and the second housing wall define a housing opening to receive a sealing assembly that has an inner surface and an outer surface. A sealing opening is configured to receive a fiber optic cable associated with the fiber optic cable connection. The outer surface is configured to contact at least one of the first housing wall, the second housing wall, or the union wall when the sealing assembly is received within the housing opening.

20 Claims, 12 Drawing Sheets

RETROFIT COVER FOR FIBER OPTIC CABLE CONNECTION

CROSS REFERENCE TO RELATED APPLICATIONS

This application claims priority to PCT Patent Application No. PCT/US2020/023228 filed on Mar. 17, 2020, entitled "RETROFIT COVER FOR FIBER OPTIC CABLE CONNECTION," which is hereby incorporated by reference herein.

TECHNICAL FIELD

The instant application is directed towards a cover. For example, the instant application is directed towards a cover for a fiber optic cable connection.

BACKGROUND

Environmental conditions may play a not insubstantial role in a type of connector that is selected to connect cables. For example, where harsh, wet conditions are anticipated, an optical connector that is purchased in a pre-assembled state over-molded with a protective material may be selected. However, implementing such pre-assembled over-molded connectors requires the use of relatively expensive specialized cable assemblies.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In some examples, a cover for a fiber optic cable connection includes a cap portion. The cap portion includes a first housing portion having a first housing wall and a second housing portion having a second housing wall. The cover also includes a union portion having a union wall defining a union opening. The union portion is configured to receive the first housing portion and the second housing portion within the union opening to couple the first housing portion and the second housing portion in a closed position. When in the closed position, the first housing wall and the second housing wall define a housing opening. The cover further includes a sealing assembly configured to be received within the housing opening. The sealing assembly has an inner surface and an outer surface, the inner surface defining a sealing opening configured to receive a fiber optic cable associated with the fiber optic cable connection, the outer surface configured to contact at least one of the first housing wall, the second housing wall, or the union wall when the sealing assembly is received within the housing opening.

In some examples, a cover for a fiber optic cable connection includes a cap portion including a first housing portion having a first housing wall. The cap portion also includes a second housing portion having a second housing wall. The cover also includes a coupler portion having a first coupler device and a second coupler device. The first coupler device and the second coupler device couple the first housing portion and the second housing portion in a closed position wherein the first housing wall and the second housing wall define a housing opening. The cover still further includes a union portion having a union wall. The union portion is configured to be received within the housing opening. The cover also includes a sealing assembly configured to be received within the housing opening. The sealing assembly has an inner surface and an outer surface. The inner surface defines a sealing opening configured to receive a fiber optic cable associated with the fiber optic cable connection. The outer surface is configured to contact at least one of the first housing wall, the second housing wall, or the union wall when the sealing assembly is received within the housing opening.

In some examples, a cover for a fiber optic cable connection includes a cap portion having a wall defining a housing opening. The cover also includes a union portion having a union wall defining a union opening. The cap portion is configured to receive the union portion within the housing opening to couple the union portion and the cap portion. The cover further includes a sealing assembly configured to be received within the housing opening and the union opening. The sealing assembly has an inner surface and an outer surface. The inner surface defines a sealing opening configured to receive a fiber optic cable associated with the fiber optic cable connection. The outer surface is configured to contact at least one of the wall or the union wall when the sealing assembly is received within the housing opening and the union opening.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

Figure 1:
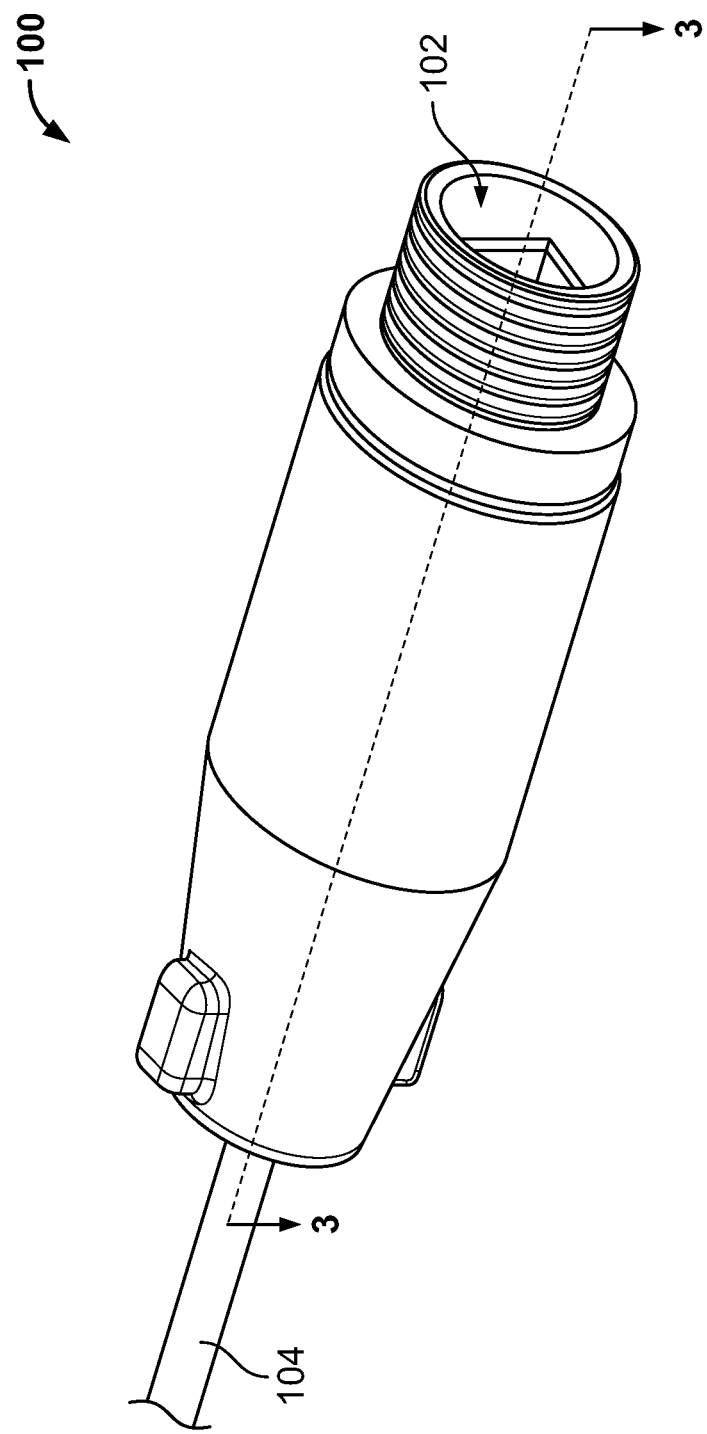
FIG. 1 is an illustration of an example cover for a fiber optic cable connection.
Figure 2:
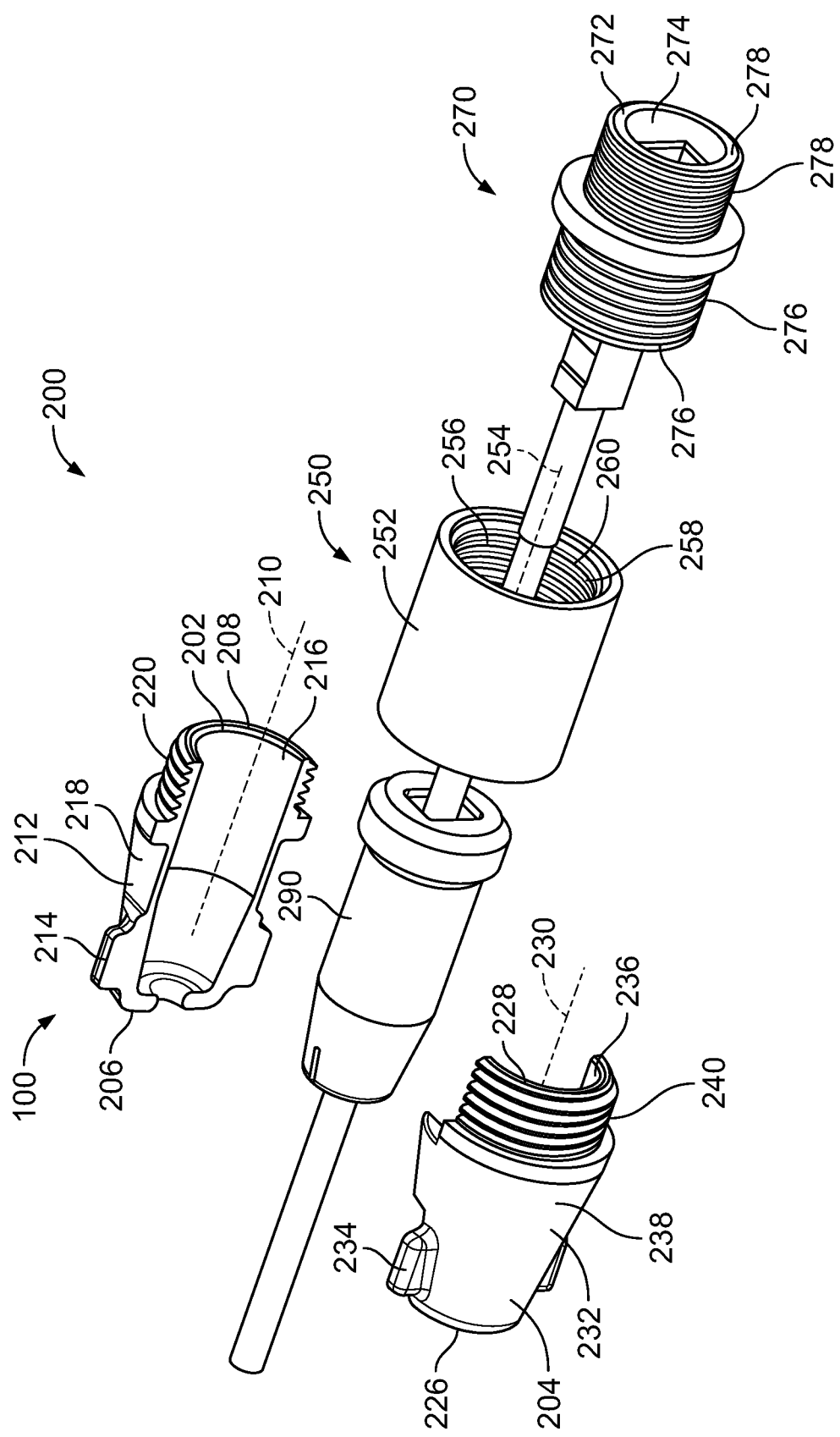
FIG. 2 is an illustration of a portion of an example cover for a fiber optic cable connection.
Figure 3:
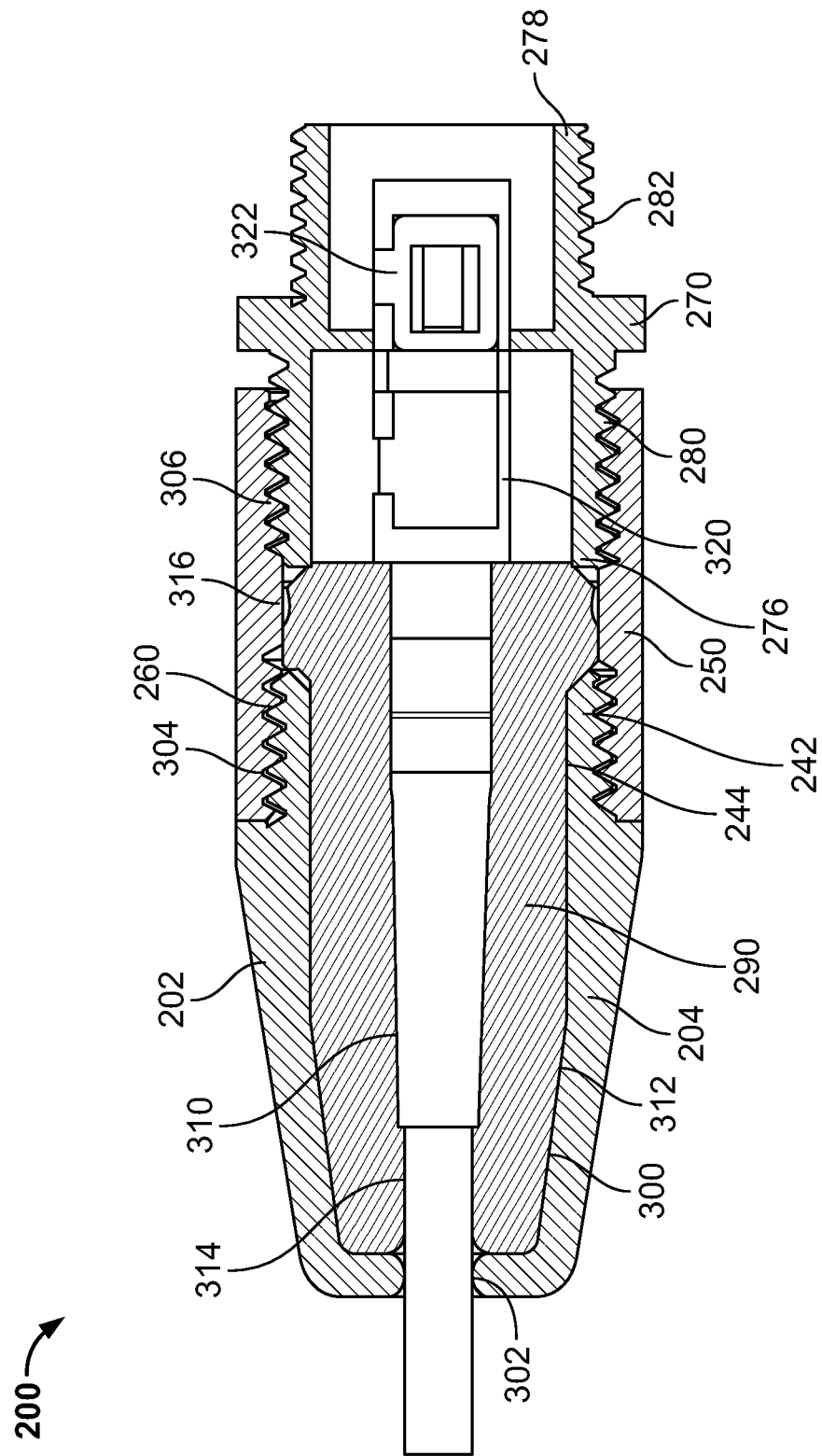
FIG. 3 is an illustration of a portion of an example cover for a fiber optic cable connection.
Figure 4:
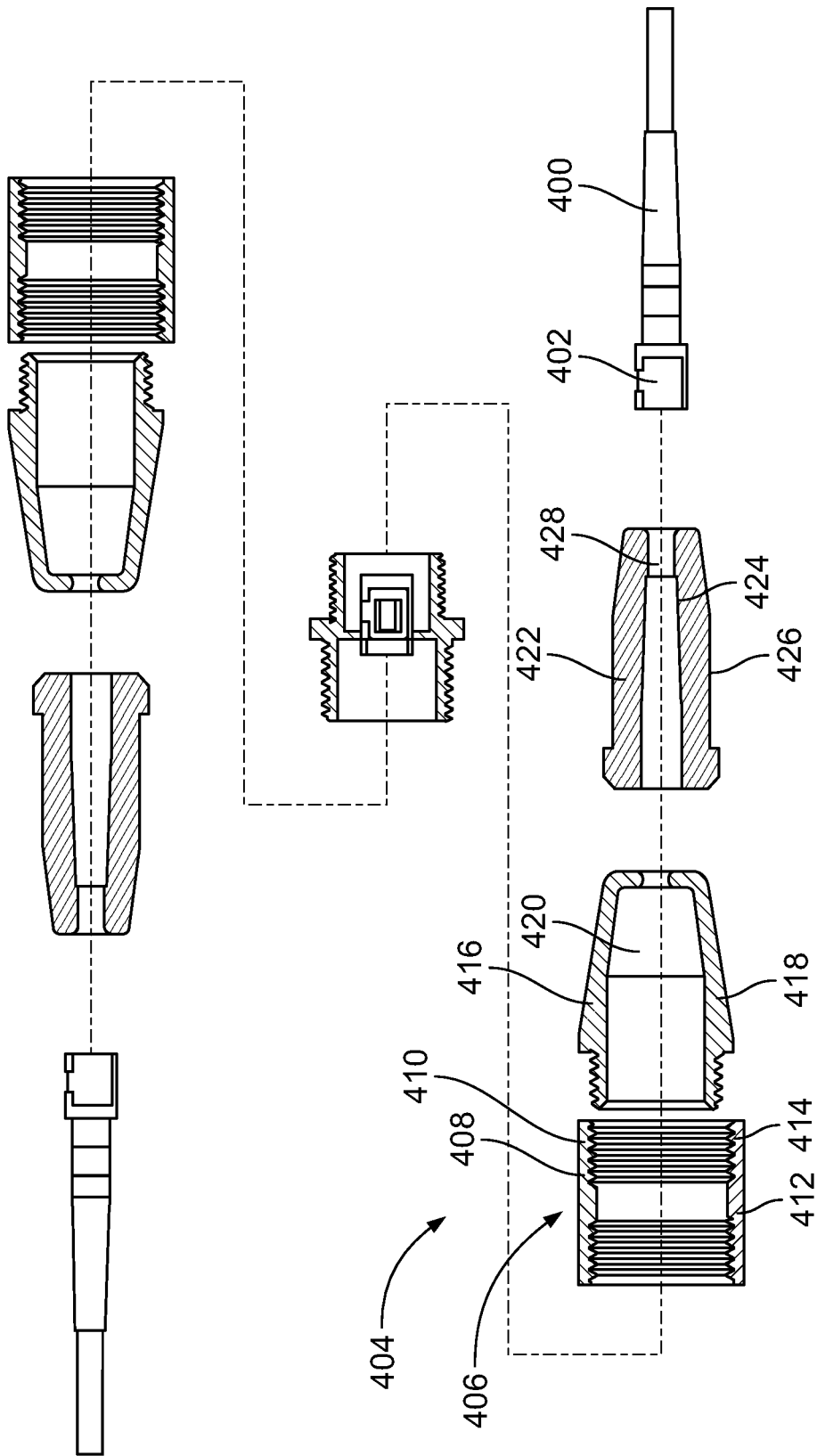
FIG. 4 is an illustration of a portion of an example cover for a fiber optic cable connection.
Figure 5:
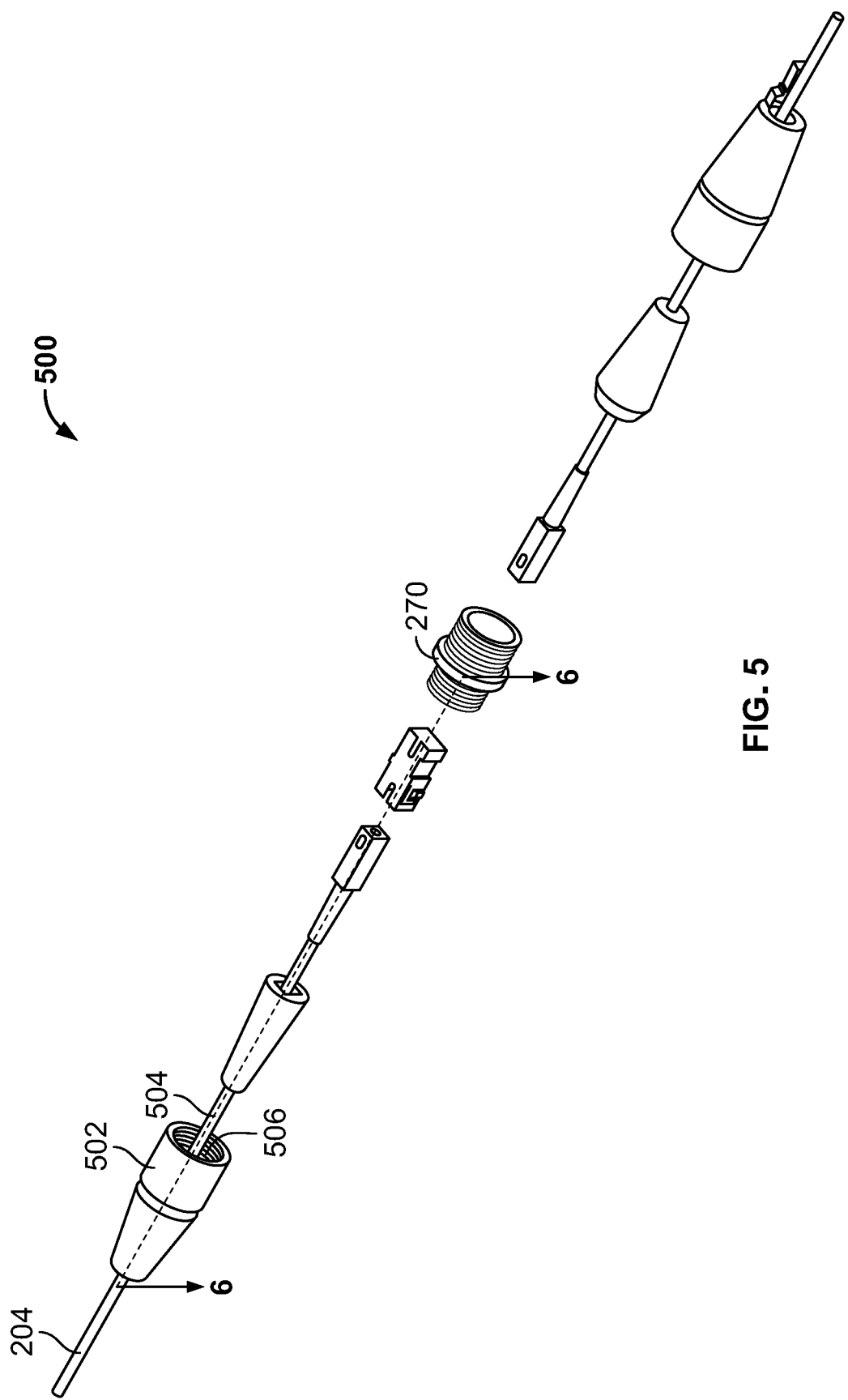
FIG. 5 is an illustration of a portion of an example cover for a fiber optic cable connection.
Figure 6:
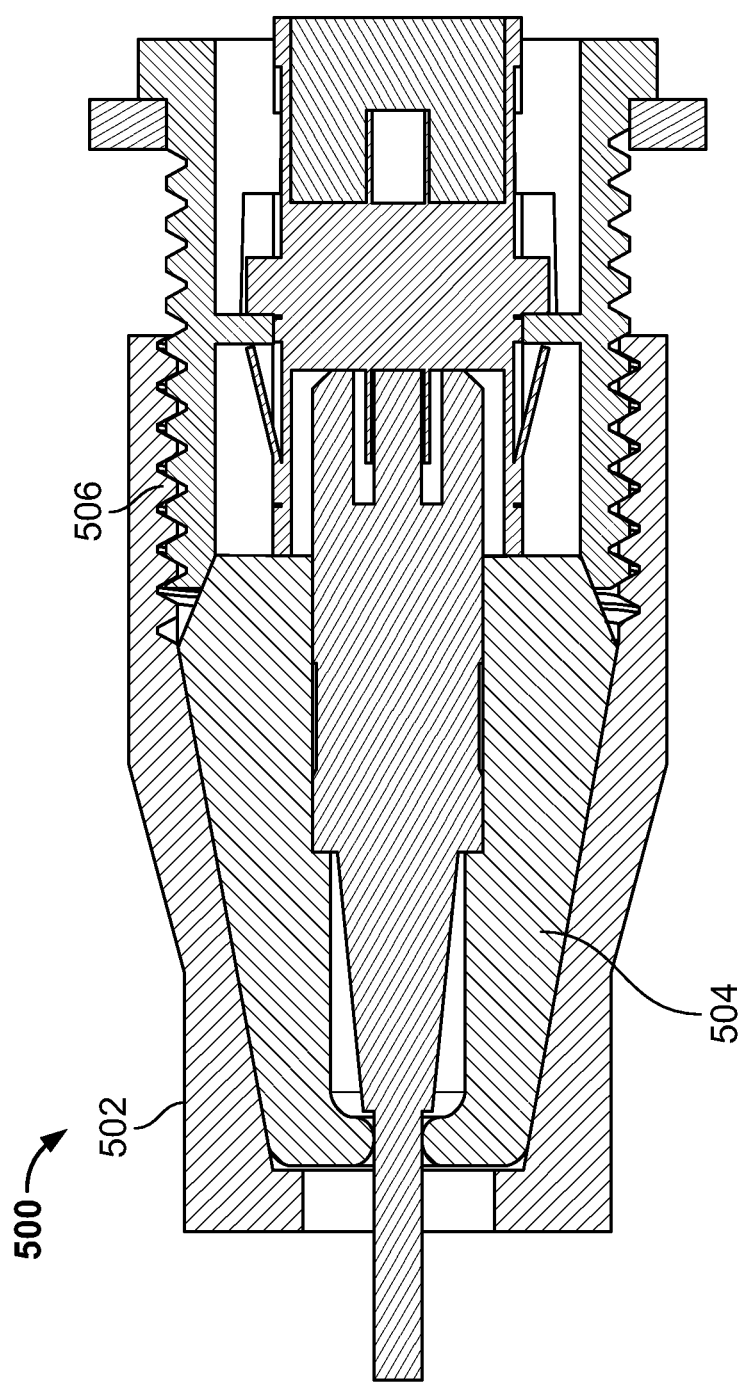
FIG. 6 is an illustration of an example cover for a fiber optic cable connection.
Figure 7:
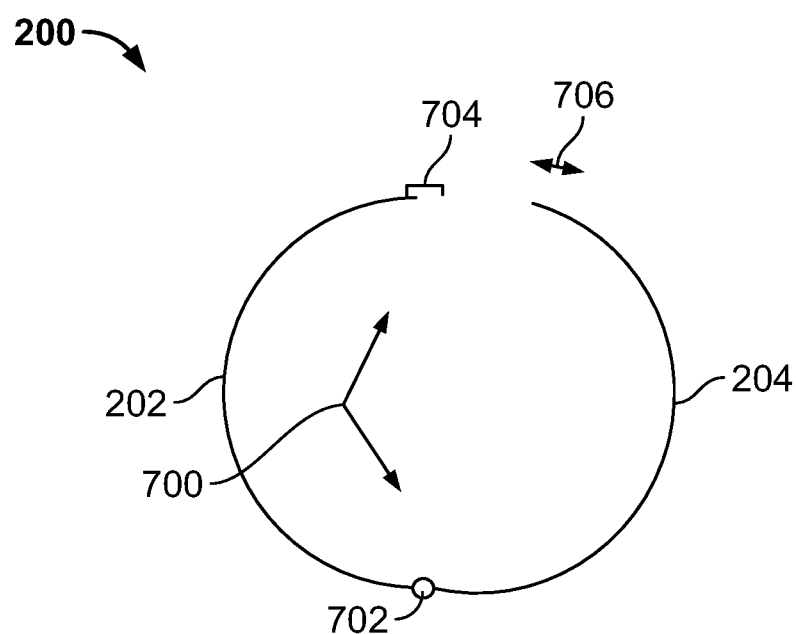
FIG. 7 is an illustration of an example cover for a fiber optic cable connection.
Figure 8:
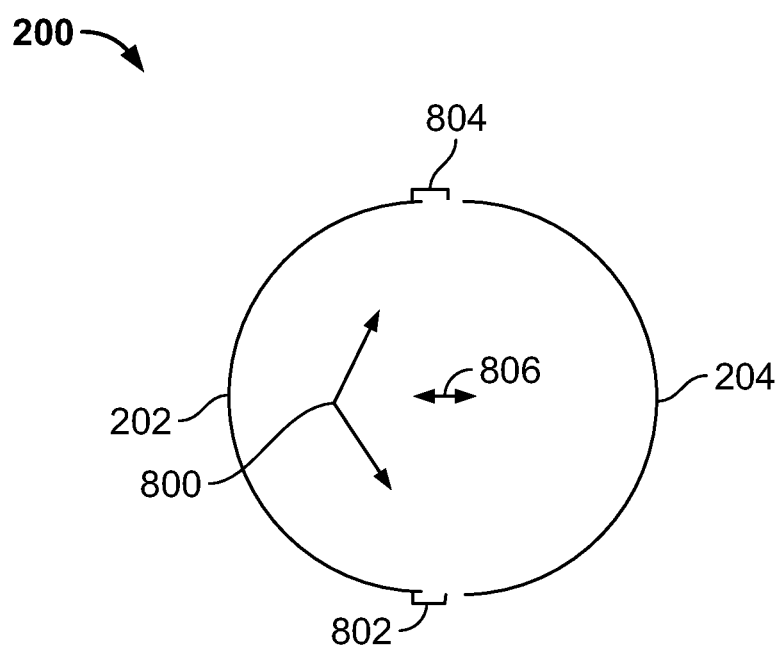
FIG. 8 is an illustration of an example cover for a fiber optic cable connection.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Figure 9:
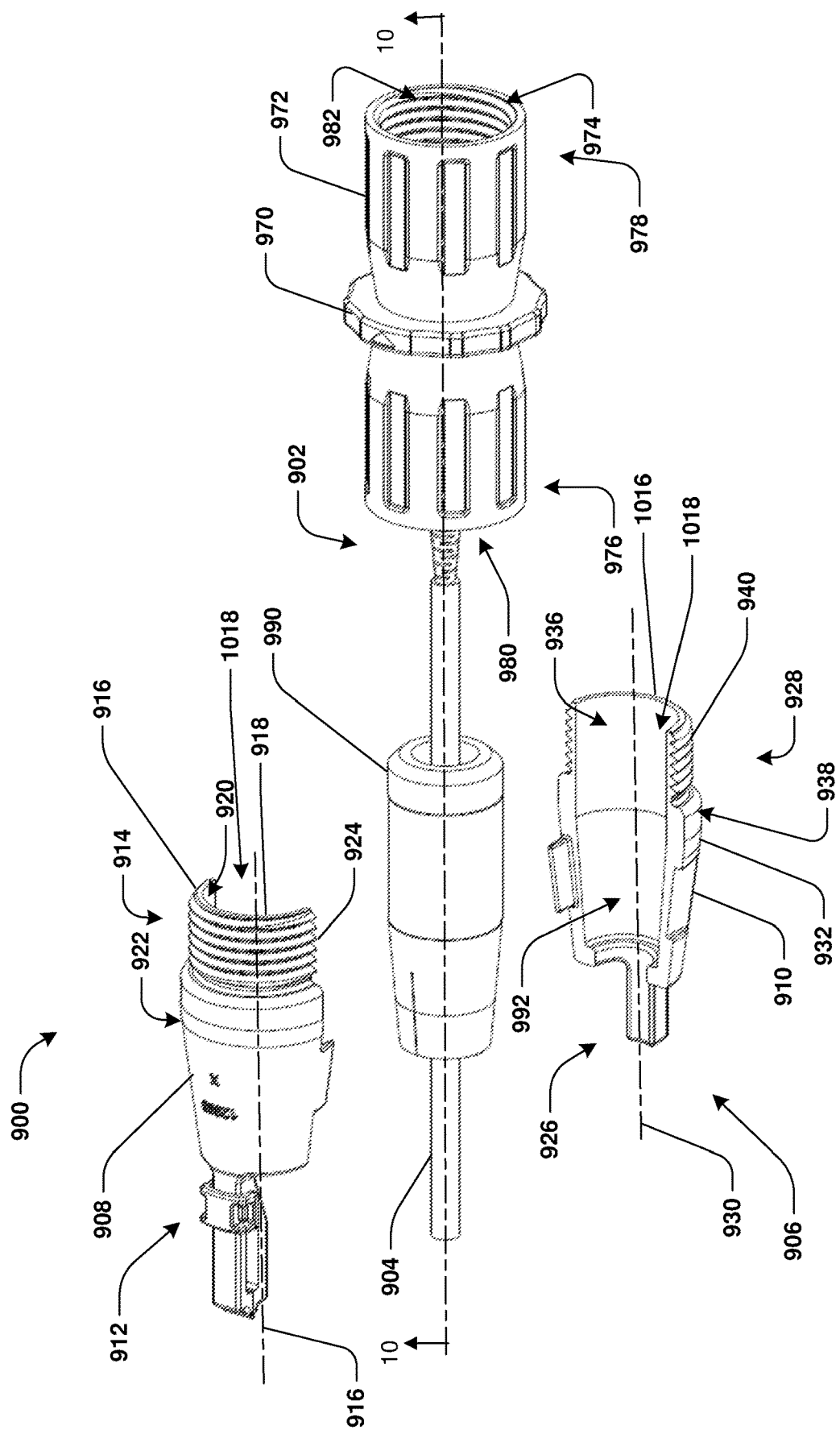
FIG. 9 is an illustration of an example cover for a fiber optic cable connection.

Referring to FIG. 9, a cover 900 for a fiber optic cable connection 902 is illustrated in a partially exploded view. The cover 900 can protect a fiber optic cable 904 with the fiber optic cable connection 902 from environmental effects. For example, the cover 900 can protect the fiber optic cable 904 from moisture (e.g., water, snow, liquids, etc.), contaminants (e.g., dust, dirt, etc.), inadvertent tampering, etc. In some examples, the cover 900 can assist in mechanically connecting two fiber optic cables together, so as to limit an inadvertent disconnect of the two fiber optic cables.

It will be appreciated that the fiber optic cable 904 may comprise a number of different structures, and is not limited to a cable. For example, the fiber optic cable 904 may comprise a rod, tube, other hollow structure, etc. In some examples, a portion of the fiber optic cable 904 may be housed within a rod, tube, other hollow structure, etc.

As shown in FIG. 9, in some examples, the cover 900 comprises a cap portion 906. The cap portion 906 comprises a first housing portion 908 and a second housing portion 910. The first housing portion 908 and the second housing portion 910 are illustrated as being separated and in an opened position in the example of FIG. 9. However, in operation and when the cover 900 is fully assembled, the first housing portion 908 can engage and/or contact the second housing portion 910 so as to define a substantially enclosed volume, similar to the example illustrated in FIG. 9.

The first housing portion 908 extends between a first end 912 and a second end 914 along a first housing axis 916. The first housing portion 908 has a first housing wall 918 that defines a substantially rounded, half-circle cross-sectional shape. In other examples, the first housing wall 918 can define an oval shape, square or rectangular shape, etc. In these examples, the first housing wall 918 can have a rounded, circular, oval, rectangular, etc. shape so as to accommodate for portions of the fiber optic cable 904.

The first housing wall 918 can have an inner surface 920 and an outer surface 922. In some examples, the outer surface 922 can be at least partially threaded. For example, the outer surface 922 of the second end 914 of the first housing wall 918 can have a first threaded portion 924. In this example, the first threaded portion 924 can extend partially along a length of the first housing wall 918 along the first housing axis 916.

The second housing portion 910 extends between a first end 926 and a second end 928 along a second housing axis 930. The second housing portion 910 has a second housing wall 932 that defines a substantially rounded, half-circle cross-sectional shape. In other examples, the second housing wall 932 can define an oval shape, square or rectangular shape, etc. In these examples, the second housing wall 932 can have a rounded, circular, oval, rectangular, etc. shape so as to accommodate for portions of the fiber optic cable 904. In some examples, the second housing portion 910 may be a mirror image of the first housing portion 908, and may have a substantially matching shape.

The second housing wall 932 can have an inner surface 936 and an outer surface 938. In some examples, the outer surface 938 can be at least partially threaded. For example, the outer surface 938 of the second end 928 of the second housing wall 932 can have a second threaded portion 940. In this example, the second threaded portion 940 can extend partially along a length of the second housing wall 932 along the second housing axis 930.

The cover 900 comprises a union portion 970. The union portion 970 has a union wall 972 that defines a union opening 974. In some examples, the union portion 970 is configured to receive the cap portion 906 within the union opening 974. The union portion 970 extends between a first mating end 976 and a second mating end 978. In some examples, an outer surface of the first mating end 976 comprises a first threaded portion 980, and an outer surface of the second mating end 978 comprises a second threaded portion 982.

The cover 900 comprises a sealing assembly 990. The sealing assembly 990 is configured to be received within a housing opening 992 defined within the first housing portion 908 and the second housing portion 910. The sealing assembly 990 comprises any number of materials that can facilitate a seal, such as rubber, elastomeric materials, polymeric materials, or the like. In some examples, the sealing assembly 990 can receive the fiber optic cable 904 so as to form a seal with respect to the fiber optic cable 904. In addition, the sealing assembly 990 can contact and form a seal with the first housing portion 908 and the second housing portion 910.

Figure 10:
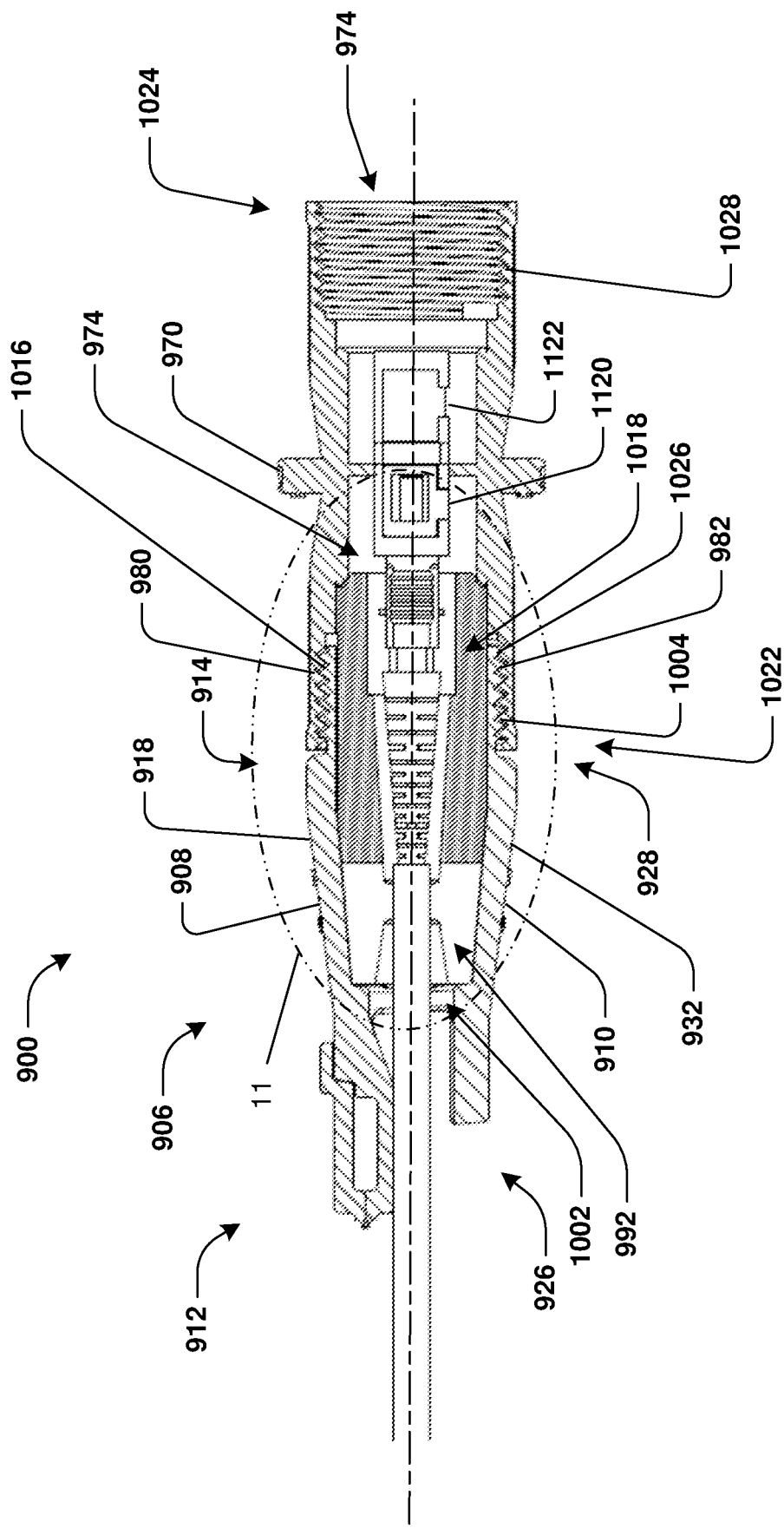
FIG. 10 is a cross section view of an example cover for a fiber optic cable connection.

Referring to FIG. 10, a cross-sectional illustration of the cover 900 as viewed from the perspective indicated by 2-2 in FIG. 9 is illustrated. In this example, the cap portion 906 is in a closed position, such that the cover 900 can surround, encapsulate, protect, etc. the fiber optic cable 904. In some examples, the first housing portion 908 and the second housing portion 910 can contact and engage each other such that the first housing portion 908 and the second housing portion 910 are in the closed position, as illustrated. The first housing portion 908 and the second housing portion 910 can be axially aligned while contacting/engaging each other, such that the first end 912 of the first housing portion 908 is in alignment with the first end 926 of the second housing portion 910. Likewise, the second end 914 of the first housing portion 908 may be in alignment with the second end 928 of the second housing portion 910. In the closed position, the first housing wall 918 and the second housing wall 932 can define a housing opening 992. In addition, in the closed position, the first housing axis 916 is substantially parallel with respect to the second housing axis 930. In some examples, the first housing portion 908 and the second housing portion 910 may extend co-axially with respect to each other.

When the first housing portion 908 and the second housing portion 910 are in the closed position, the first end 912 of the first housing portion 908 and the first end 926 of the second housing portion 910 define a first end opening 1002 through which the fiber optic cable 904 extends. In some examples, the first end opening 1002 can have a cross-sectional size that substantially matches a cross-sectional size of the fiber optic cable 904. In such examples, due to the cross-sectional sizes of the first end opening 1002 and the fiber optic cable 904 substantially matching, the fiber optic cable 904 may be in contact with the first housing wall 918 and the second housing wall 932 as the fiber optic cable 904 passes through the first end opening 1002. By being in contact with the fiber optic cable 904, the first housing portion 908 and the second housing portion 910 can limit the ingress of moisture, contaminants, etc. through the first end opening 1002. In some examples, the first end opening 1002 does not have a cross-sectional size that substantially matches the cross-sectional size of the fiber optic cable 904.

When the first housing portion 908 and the second housing portion 910 are in the closed position, the second end 914 of the first housing portion 908 and the second end 928 of the second housing portion 910 can define a threaded attachment portion 1004 (e.g., an attachment portion 1004) configured to attach to the union portion 970. In this example, the threaded attachment portion 1004 comprises the first threaded portion 924 of the first housing wall 918 and the second threaded portion 940 of the second housing wall 932. Together, the first threaded portion 924 and the second threaded portion 940 form the substantially continuous threaded attachment portion 1004 around an outer surface of the first housing wall 918 and the second housing wall 932. In some examples, the attachment portion 1004 can have an attachment wall 1016 that defines an attachment opening 1018 (also shown in FIG. 9 for clarity).

The union portion 970 includes a union opening 974 and can receive the first housing portion 908 and the second housing portion 910 within the union opening 974 to couple the first housing portion 908 and the second housing portion 910 in the closed position. In some examples, when the union portion 970 does not couple the first housing portion 908 and the second housing portion 910, the first housing portion 908 is separable from the second housing portion 910, similar to the example illustrated in FIG. 9. In some examples, the union portion 970 and the union opening 974 extend from a first end 1022 to a second end 1024. The first end 1022 can include a first threaded portion 1026 (e.g., a female threaded portion). The second end 1024 can include a second threaded portion 1028 (e.g., a female threaded portion).

The threaded attachment portion 1004 of the first housing portion 908 and the second housing portion 910 can engage, attach to, couple with, etc. the first threaded portion 1026 of the union portion 970. In some examples, the union portion 970 is configured to receive the threaded attachment portion 1004 of the first housing portion 908 and the second housing portion 910 within the union opening 974. In this way, the threaded attachment portion 1004 can engage and mate with the first threaded portion 1026 of the union portion 970. Due to the first threaded portion 1026 of the union portion 970 engaging and mating with the threaded attachment portion 1004 of the cap portion 906, the union portion 970 is limited from being inadvertently removed from the cap portion 906. Likewise, in some examples, the engagement between the first threaded portion 1026 and the threaded attachment portion 1004 can limit the ingress of moisture, contaminants, etc. through the attachment of the cap portion 906 and the union portion 970.

Figure 11:
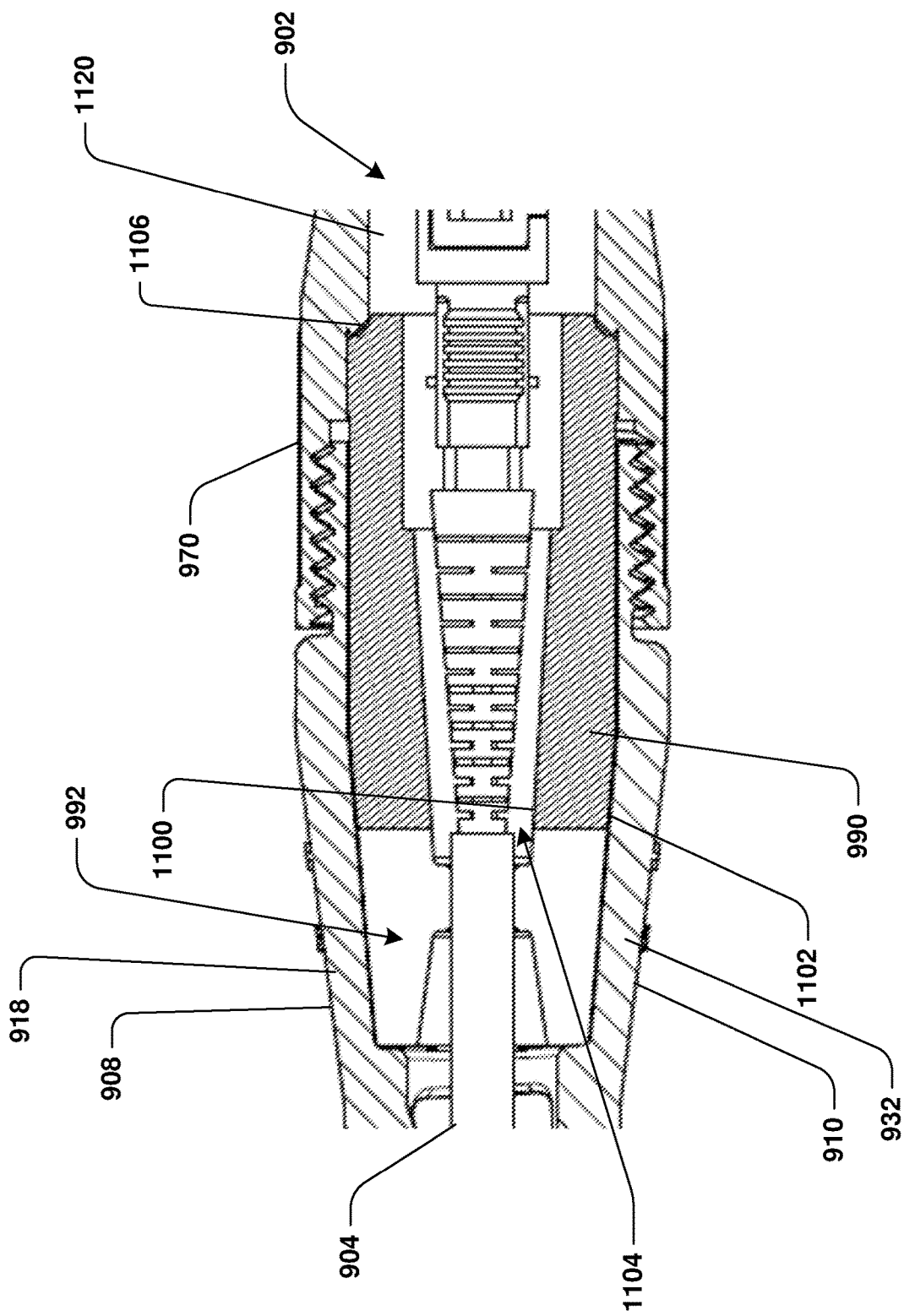
FIG. 11 is an illustration of an example cover for a fiber optic cable connection.

Referring to FIG. 11, the sealing assembly 990 is configured to be received within the housing opening 992. In some examples, the sealing assembly 990 has an inner surface 1100 and an outer surface 1102. The inner surface 1100 defines a sealing opening 1104 that is configured to receive the fiber optic cable 904 associated with the fiber optic cable connection 902. The sealing assembly can form a seal with respect to the fiber optic cable 904. In some examples, the outer surface 1102 may be compressed against a mating end 1106 of the union portion 970. This compression can form a seal between the union portion 970 and the sealing assembly 990. As such, the ingress of moisture, contaminants, etc. between the sealing assembly 990 and the fiber optic cable 904 (e.g., from left to right in FIG. 11) is substantially limited.

The outer surface 1102 of the sealing assembly 990 can contact at least one of the first housing wall 918 of the first housing portion 908 and/or the second housing wall 932 of the second housing portion 910 when the sealing assembly 990 is received within the housing opening 992. The sealing assembly 990 can form a seal with respect to the first housing wall 918 and the second housing wall 932 (e.g., a seal is formed between the sealing assembly 990 and the first housing portion 908 and the second housing portion 910.

In some examples, the sealing assembly 990 can form a seal with the first mating end 1106 of the union portion 970. This seal can be formed due to the union portion 970 being threaded onto the threaded attachment portion 1004 of the first housing portion 908 and the second housing portion 910, which causes the sealing assembly 990 to contact/engage the first mating end 1106 of the union portion 970. As a result, an ingress of fluid, moisture, etc. is substantially limited due to the seal between the first mating end 1106 of the union portion 970 and the sealing assembly 990.

The fiber optic cable 904 may comprise a first fiber optic plug 1120 that is located at an end of the fiber optic cable 904. The first fiber optic plug 1120 may comprise a connector that terminates the end of an optical fiber. The first fiber optic plug 1120 can be coupled (e.g., mechanically and electrically) to another fiber optic plug, so as to couple (e.g., mechanically and electrically) the fiber optic cable 904 and a second fiber optic cable. In this example, the first fiber optic plug 1120 may be located at least partially within the cap portion 906 when the union portion 970 receives the first housing portion 908 and the second housing portion 910 within the union opening 974. In such examples, the sealing assembly 990 can be adjacent to, in contact with, and/or may form a seal with the first fiber optic plug 1120 and/or the fiber optic cable 904 adjacent to the first fiber optic plug 1120.

Returning to FIG. 10, a second fiber optic plug 1122 is located within the union opening 974 of the union portion 970. The second fiber optic plug 1122 may comprise a connector that terminates the end of an optical fiber and/or may comprise a connector that connects two fiber optic cables and/or may comprise a connector that connects two fiber optic plugs of two fiber optic cables. The first fiber optic plug 1120 and the second fiber optic plug 1122 can be electrically connected when the union portion 970 receives the first housing portion 908 and the second housing portion 910 within the union opening 974.

Figure 12:
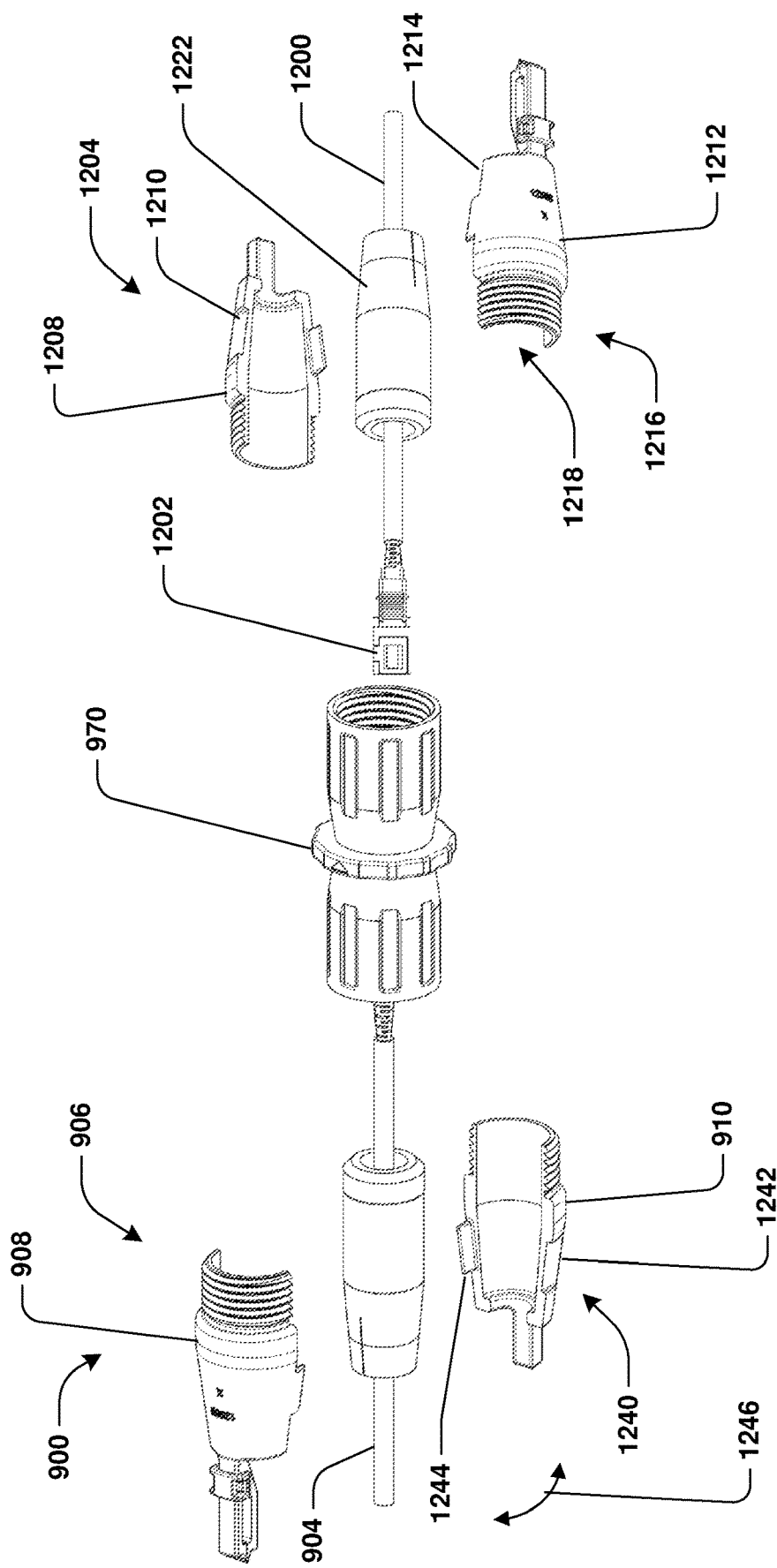
FIG. 12 is an illustration of an example cover for a fiber optic cable connection.

Referring to FIG. 12, an exploded illustration of the cover 900 is illustrated. In some examples, a second fiber optic cable 1200 can be electrically connected to the second fiber optic plug 1122 (shown in FIG. 10) and, thus, to the fiber optic cable 904. The second fiber optic cable 1200 comprises a third fiber optic plug 1202 that can be mechanically and electrically connected to the second fiber optic plug 1122. The third fiber optic plug 1202 may comprise a connector that terminates the end of the second fiber optic cable 1200. The third fiber optic plug 1202 is removed from the union portion 970 for clarity.

A second cover 1204 can be provided for covering the second fiber optic cable 1200 and the third fiber optic plug 1202. In some examples, the second cover 1204 is substantially similar to the cover 900. For example, the second cover 1204 includes a second cap portion 1206 which includes a third housing portion 1208 and a fourth housing portion 1212. The third housing portion 1208 has a third housing wall 1210 and the fourth housing portion 1212 has a fourth housing wall 1214.

The second cap portion 1206 comprises a first attachment portion 1216 similar to the first attachment portion 1004. The union portion 970 is configured to receive the third housing portion 1208 and the fourth housing portion 1212 within the second mating end 978 to couple the third housing portion 1208 and the fourth housing portion 1212 in a closed position. In some examples, the third housing wall 1210 and the fourth housing wall 1214 can define a second housing opening 1218.

The second cover 1204 comprises a second sealing assembly 1222 having an inner surface 1224 and an outer surface 1226. The second sealing assembly 1222 has a second sealing opening 1228 that can receive the second fiber optic cable 1200. The second sealing assembly 1222 can form a seal with respect to the second fiber optic cable 1200, the third housing portion 1208, the fourth housing portion 1212, and/or the union portion 970. In some examples, the union portion 970 is configured to couple the cover 900 and the second cover 1204.

In some examples, the cover 900 and the second cover 1204 can be attached to the fiber optic cable 904 and the second fiber optic cable 1200, respectively. For example, the sealing assembly 990 can be inserted over the fiber optic cable 904, such that the fiber optic cable 904 and the first fiber optic plug 1120 can be inserted through the sealing opening 1104 of the sealing assembly 990. In some examples, the sealing assembly 990 may have at least some degree of compressibility/flexibility, such that the sealing assembly 990 can receive the fiber optic cable 904 and the first fiber optic plug 1120 through the sealing opening 1104.

With the sealing assembly 990 receiving the fiber optic cable 904 and the first fiber optic plug 1120, the cap portion 906 can be inserted over the sealing assembly 990. In such examples, the first housing portion 908 and the second housing portion 910 of the cap portion 906 can be moved from the opened position (e.g., as illustrated in FIG. 9) to the closed position (e.g., as illustrated in FIG. 10). In the closed position, the sealing assembly 990 can be received within the housing opening 992 defined by the first housing portion 908 and the second housing portion 910.

To maintain the first housing portion 908 and the second housing portion 910 in the closed position, the union portion 970 can receive the second ends of the first housing portion 908 and the second housing portion 910. In this example, the threaded attachment portion 1004 of the first housing portion 908 and the second housing portion 910 can engage with the threaded portion 980 of the union portion 970.

The union portion 970 can be attached or coupled to the cap portion 906. In some examples, the second fiber optic plug 1122 of the union portion 970 can be mated with the first fiber optic plug 1120 of the fiber optic cable 904. Next, the union portion 970 can receive the second ends of the first housing portion 908 and the second housing portion 910 within the union opening 974. In such examples, the first threaded portion 1080 of the union portion 970 can engage and mate with the first housing portion 908 and the second housing portion 910.

In a similar manner, the second cover 1204 can be attached to the second fiber optic cable 1200. For example, the second sealing assembly 1222 can be positioned to receive the second fiber optic cable 1200 and the third fiber optic plug 1202 through the second sealing opening 1228. Several of these features can be mirror images of the features in the cover 900, and further explanation is not provided. Next, the third housing portion 1208 and the fourth housing portion 1212 can be coupled together so as to receive the second sealing assembly 1222. The union portion 970 can be coupled to the third housing portion 1208 and the fourth housing portion 1212. The third fiber optic plug 1202 can be connected to the second fiber optic plug 1122 of the union portion 970.

Remaining with FIG. 12, another example of the cap portion 906 is illustrated. In this example, the cap portion 906 comprises the first housing portion 908 and the second housing portion 910. The first housing portion 908 and the second housing portion 910 are not limited to being coupled by the union portion 970 as illustrated in FIG. 10. Rather, a coupler portion 1240 may be provided for coupling the first housing portion 908 and the second housing portion 910.

In this example, the coupler portion 1240 comprises a first coupler device 1242 and a second coupler device 1244. The first coupler device 1242 may comprise a hinge that movably attaches the first housing portion 908 and the second housing portion 910. For example, the first coupler device 1242 can allow for the first housing portion 908 and the second housing portion 910 to be moved between an opened position, in which the fiber optic cable 904, sealing assembly 990, etc. can be inserted into the opening defined by the first housing portion 908 and the second housing portion 910, and a closed position.

Opposite the first coupler device 1242 is the second coupler device 1244. In this example, the second coupler device 1244 may comprise any number of mechanical fastening structures that allow for the first housing portion 908 and the second housing portion 910 to be selectively attached together. In some examples, the second coupler device 1244 may comprise a latch located on one of the first housing portion 908 or the second housing portion 910. The latch can engage an opening defined within the other of the first housing portion 908 or the second housing portion 910. In such examples, the latch is configured to be removably inserted into the opening. When the latch is received within the opening, the second coupler device 1244 can function to maintain the first housing portion 908 and the second housing portion 910 in the closed position. When the latch is not received within the opening, the first coupler device 1242 can allow for the first housing portion 908 and the second housing portion 910 to rotate/move with respect to each other along a movement direction 1246 between the opened position and the closed position. It is to be understood that the first coupler device 1242 and the second coupler device 1244 can include any number of mechanical structures including latches, notches, mechanical fasteners, hooks, etc. As noted, the first coupler device 1242 and the second coupler device 1244 can enable coupling of the first housing portion 908 and the second housing portion 910 without the union portion 970. As a result, the cap portions 906, 1206 can be configured to receive the union portion 970 threaded portions 1026, 1028. In other words, the cap portions 906, 1206 can include female threaded structures to receive male threaded structures of the union portion 970.

The cover 900 described herein is beneficial for a number of reasons. For example, the cover 900 can be provided for covering the fiber optic cable connection 902 (e.g., the fiber optic cable 904, the second fiber optic cable 1200, etc.). A user can retrofit an existing fiber optic cable connection 902 with the cover 900. For example, the user can insert the sealing assembly 990 over the fiber optic cable 904. The cap portion 906 can then be placed over the sealing assembly 990. The union portion 970 can be coupled to the cap portion 906. In this example, the cover 900 can shield the fiber optic cable 904 from moisture (e.g., water, snow, liquids, etc.), contaminants (e.g., dust, dirt, etc.), inadvertent tampering, etc. In addition, the cover 900 can provide a stronger and more robust connection between the fiber optic plugs. That is, the first fiber optic plug 1120 can be located within and fixed with respect to the cap portion 906 while the second fiber optic plug 1122 can be located within and fixed with respect to the union portion 970. As such, due to the attachment between the cap portion 906 and the union portion 970, the likelihood of an inadvertent disconnection between the first fiber optic plug 1120 and the second fiber optic plug 1122 is reduced.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first location and a second location correspond to location A and location B or two different or two identical locations or the same location.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A cover for a fiber optic cable connection, the cover comprising:
   a cap portion comprising:
      a first housing portion having a first housing wall; and
      a second housing portion having a second housing wall;
   a union portion having a union wall defining a union opening, the union portion configured to receive the first housing portion and the second housing portion within the union opening to couple the first housing portion and the second housing portion in a closed position wherein the first housing wall and the second housing wall define a housing opening, the union portion having a mating end shoulder located within an interior of the union portion; and
   a sealing assembly configured to be received within the housing opening and having an inner surface and an outer surface, the inner surface defining a sealing opening configured to receive a fiber optic cable associated with the fiber optic cable connection, the outer surface configured to contact the first housing wall, the second housing wall, and the union wall when the sealing assembly is received within the housing opening, and the outer surface being compressed against the mating end shoulder.

2. The cover of claim 1, the cap portion extending between a first end and a second end, the first end defining a first end opening through which the fiber optic cable extends.

3. The cover of claim 1, the cap portion defining a first attachment portion that couples to the union portion.

4. The cover of claim 3, the union wall comprising a second attachment portion that mates with the first attachment portion of the cap portion.

5. The cover of claim 4, at least one of the first attachment portion comprising a first threaded portion or the second attachment portion comprising a second threaded portion.

6. The cover of claim 5, the first attachment portion comprising the first threaded portion.

7. The cover of claim 5, the second attachment portion comprising the second threaded portion.

8. The cover of claim 1 comprising:
   a second cap portion comprising:
      a third housing portion having a third housing wall; and
      a fourth housing portion having a fourth housing wall;
   the union portion configured to receive the third housing portion and the fourth housing portion within the union opening to couple the third housing portion and the fourth housing portion in a closed position wherein the third housing wall and the fourth housing wall define a second housing opening; and
   a second sealing assembly configured to be received within the second housing opening and having an inner surface and an outer surface, the inner surface of the second sealing assembly defining a sealing opening configured to receive a second fiber optic cable associated with the fiber optic cable connection, the outer surface of the second sealing assembly configured to contact at least one of the third housing wall, the fourth housing wall, or the union wall when the second sealing assembly is received within the second housing opening.

9. The cover of claim 8, the second cap portion comprising a first attachment portion that couples to the union portion.

10. The cover of claim 9, the union wall comprising a second attachment portion that mates with the first attachment portion of the second cap portion.

11. The cover of claim 10, at least one of the first attachment portion comprising a first threaded portion or the second attachment portion comprising a second threaded portion.

12. A cover for a fiber optic cable connection, the cover comprising:
 a cap portion comprising:
  a first housing portion having a first housing wall; and
  a second housing portion having a second housing wall;
 a union portion having a union wall defining a union opening, the union portion configured to receive the first housing portion and the second housing portion within the union opening to couple the first housing portion and the second housing portion in a closed position wherein the first housing wall and the second housing wall define a housing opening, the union portion having a mating end shoulder located within an interior of the union portion; and
 a sealing assembly configured to be received within the housing opening and having an inner surface and an outer surface, the inner surface defining a sealing opening configured to receive a fiber optic cable associated with the fiber optic cable connection, the outer surface configured to contact at least one of the first housing wall, the second housing wall, or the union wall when the sealing assembly is received within the housing opening, and the outer surface being compressed against the mating end shoulder opening.

13. The cover of claim 12, the cap portion extending between a first end and a second end, the first end defining a first end opening through which the fiber optic cable extends.

14. The cover of claim 12, the cap portion defining a first attachment portion that couples to the union portion.

15. The cover of claim 14, the union wall comprising a second attachment portion that mates with the first attachment portion of the cap portion.

16. The cover of claim 15, at least one of the first attachment portion comprising a first threaded portion or the second attachment portion comprising a second threaded portion.

17. A cover for a fiber optic cable connection, the cover comprising:
 a cap portion comprising:
  a first housing portion having a first housing wall; and
  a second housing portion having a second housing wall;
 a union portion having a union wall defining a union opening, the union portion configured to receive the first housing portion and the second housing portion within the union opening to couple the first housing portion and the second housing portion in a closed position wherein the first housing wall and the second housing wall define a housing opening, the union portion having a mating end shoulder located within an interior of the union portion; and
 a sealing assembly configured to be received within the housing opening and having an inner surface and an outer surface, the inner surface defining a sealing opening configured to receive a fiber optic cable associated with the fiber optic cable connection, the outer surface configured to contact at least two of the first housing wall, the second housing wall, or the union wall when the sealing assembly is received within the housing opening, and the outer surface being compressed against the mating end shoulder opening.

18. The cover of claim 17, the cap portion extending between a first end and a second end, the first end defining a first end opening through which the fiber optic cable extends.

19. The cover of claim 17, the cap portion defining a first attachment portion that couples to the union portion.

20. The cover of claim 19, the union wall comprising a second attachment portion that mates with the first attachment portion of the cap portion.

* * * * *